United States Patent
Sugimoto et al.

(10) Patent No.: US 10,259,146 B2
(45) Date of Patent: Apr. 16, 2019

(54) PRODUCING METHOD FOR CYLINDER BLOCK

(71) Applicant: TOYOTA JIDOSHA KABUSHIKI KAISHA, Toyota-shi (JP)

(72) Inventors: Shinsuke Sugimoto, Toyota (JP); Takashi Shimura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 395 days.

(21) Appl. No.: 15/098,753

(22) Filed: Apr. 14, 2016

(65) Prior Publication Data

US 2016/0303773 A1 Oct. 20, 2016

(30) Foreign Application Priority Data

Apr. 16, 2015 (JP) ................................. 2015-084224

(51) Int. Cl.

| | |
|---|---|
| B05D 1/08 | (2006.01) |
| B05D 3/12 | (2006.01) |
| B05D 7/22 | (2006.01) |
| C23C 4/08 | (2016.01) |
| C23C 4/18 | (2006.01) |
| F02F 1/00 | (2006.01) |
| B24B 33/02 | (2006.01) |
| B29C 41/08 | (2006.01) |
| B29L 31/00 | (2006.01) |
| C23C 4/131 | (2016.01) |

(52) U.S. Cl.
CPC ............... *B29C 41/08* (2013.01); *B05D 1/08* (2013.01); *B05D 3/12* (2013.01); *B05D 7/22* (2013.01); *B24B 33/02* (2013.01); *C23C 4/08* (2013.01); *C23C 4/131* (2016.01); *C23C 4/18* (2013.01); *F02F 1/00* (2013.01); *B29L 2031/749* (2013.01)

(58) Field of Classification Search
CPC .... C23C 4/00; C23C 4/04; C23C 4/08; C23C 4/12; C23C 4/131; C23C 4/18; F02F 1/00; F02F 1/004; F02F 1/18; B24B 33/02; B05D 1/08; B05D 3/12; B05D 7/22
USPC ....... 427/230–239, 449, 355, 356, 357, 367, 427/369, 359
See application file for complete search history.

(56) References Cited

U.S. PATENT DOCUMENTS

| | | | |
|---|---|---|---|
| 6,044,820 A | 4/2000 | Domanchuk et al. | |
| 2018/0045134 A1* | 2/2018 | Yang | F02F 1/18 |

FOREIGN PATENT DOCUMENTS

| | | | |
|---|---|---|---|
| JP | 51-57320 | | 5/1976 |
| JP | 06293952 A | * | 10/1994 |
| JP | 2004-100645 | | 4/2004 |
| JP | 2005-298884 A | | 10/2005 |
| JP | 2006-220018 A | | 8/2006 |
| JP | 2008-303439 A | | 12/2008 |

(Continued)

*Primary Examiner* — William P Fletcher, III
(74) *Attorney, Agent, or Firm* — Oblon, McClelland, Maier & Neustadt, L.L.P.

(57) ABSTRACT

A producing method for a cylinder block includes: a spraying step of spraying a metallic material onto a bore inner surface of at least one cylinder bore formed in the cylinder block to form a spray deposit thereon; a pressurizing step of applying a predetermined pressure onto a surface of the spray deposit formed on the bore inner surface in the spraying step; and a honing step of applying a honing processing to the surface of the spray deposit after the pressurizing step.

3 Claims, 4 Drawing Sheets

SPRAYING STEP    PRESSURIZING STEP    HONING STEP

(56) References Cited

FOREIGN PATENT DOCUMENTS

| JP | 2013-23762 | | 2/2013 |
| JP | 2013023762 A | * | 2/2013 |
| JP | 2016205159 A | * | 12/2016 |

* cited by examiner

PRODUCING METHOD FOR CYLINDER BLOCK

INCORPORATION BY REFERENCE

The disclosure of Japanese Patent Application No. 2015-084224 filed on Apr. 16, 2015 including the specification, drawings and abstract is incorporated herein by reference in its entirety.

BACKGROUND

1. Technical Field

The present disclosure relates to a producing method for a cylinder block.

2. Description of Related Art

Japanese Patent Application Publication No. 2013-23762 discloses a method of forming a spray deposit by spraying a metallic material onto an inner wall surface of a cylinder bore (bore inner surface) of a cylinder block for an internal combustion engine. A surface of the spray deposit formed on the bore inner surface of the cylinder block is finished through a honing processing into a sliding surface where a piston housed in the cylinder block slides. On the surface (sliding surface) of the spray deposit after the honing processing, gas pockets formed in the spray deposit during the spraying appear as pits so that oil is retained in the pits.

SUMMARY

As a pit area ratio (pit ratio) of the pits formed in the surface of the spray deposit after the honing processing becomes increased, amount of oil retained in the pits becomes increased during engine operation. Thus, an increase in amount of oil consumption due to oil combustion can occur.

The present disclosure provides a producing method for a cylinder block capable of reducing a pit area ratio in a surface of a spray deposit formed in a bore inner surface of the cylinder block.

According to an aspect of the present disclosure, a producing method for a cylinder block is provided. The producing method includes: a spraying step of spraying a metallic material onto an bore inner surface of at least one cylinder bore formed in the cylinder block to form a spray deposit thereon; a pressurizing step of applying pressure to compress the spray deposit formed on the bore inner surface in the spraying step; and a honing step of applying a honing processing to a surface of the spray deposit after the pressurizing step.

According to the aforementioned configuration, after the spraying step and before the honing step, the pressurizing step is carried out, and the gas pockets formed inside the spray deposit are pressed to be crushed in this pressurizing step; therefore, compared with the case of omitting the pressurizing step, it is possible to reduce a pit area ratio in the surface of the spray deposit after the honing processing. Accordingly, during the engine operation, amount of oil retained in the pits is reduced, thus reducing amount of oil consumption due to oil combustion.

According to the above mentioned disclosure, in the pressurizing step, a bore inner diameter of the cylinder bore may be controlled to be a bore inner diameter of the cylinder bore at a starting point of starting the honing processing (reference point of starting the processing). In this case, it becomes unnecessary to additionally carry out a boring processing before the honing step.

According to the producing method for a cylinder block of the present disclosure, since the gas pockets formed inside the spray deposit are pressed to be crushed in the pressurizing step, compared with the case of omitting the pressurizing step, it is possible to reduce the pit area ratio in the surface of the spray deposit after the honing processing. Accordingly, during the engine operation, it is possible to reduce the amount of oil retained in the pits, thereby reducing the amount of oil consumption due to oil combustion.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a cylinder block and a producing method for a cylinder block to which the present disclosure is applied will be described with reference to drawings.

A schematic configuration of the cylinder block to which the cylinder block and the producing method for the cylinder block according to the present embodiment are applied will be described with reference to FIG. 1.

Figure 1:
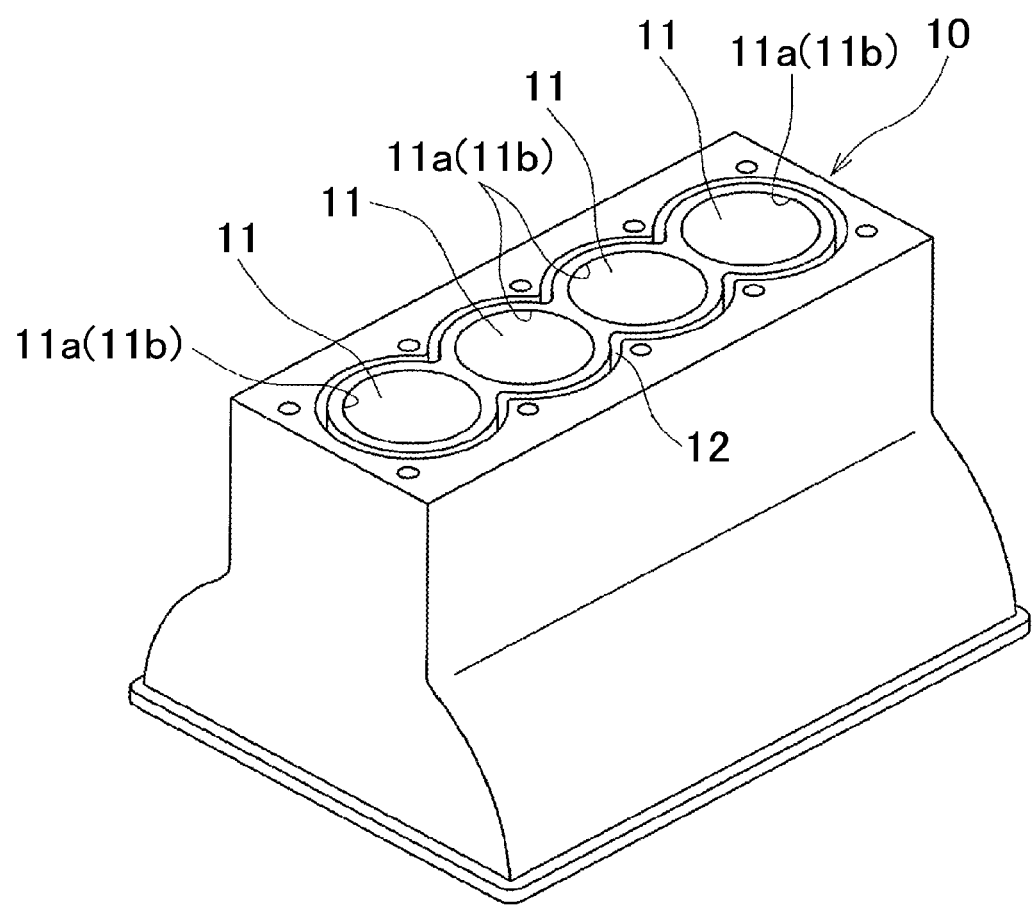
FIG. 1 is a drawing showing a schematic configuration of a cylinder block to which a producing method for a cylinder block according to the present embodiment is applied.

As shown in FIG. 1, the cylinder block 10 is a cylinder block for an in-line four-cylinder engine. The cylinder block 10 is provided with four cylinder bores 11 in line. The cylinder block 10 is made of an aluminum alloy, for example, and is formed through casting. Each of the cylinder bores 11 is defined in a cylindrical shape by an inner wall of the cylinder block 10. Not-shown respective pistons are housed in the corresponding cylinder bores 11.

A spray deposit 11*b* made of a metallic material (e.g., an iron-based metal or the like) is formed on the inner wall surface (bore inner surface) 11*a* of each cylinder bore 11. The cylinder bores 11 are surrounded by a water jacket 12. The cylinder block 10 is configured as a so-called linerless cylinder block having no cylinder liner.

The cylinder block 10 is configured to have a top surface to which a cylinder head is coupled via a not-shown cylinder head gasket. The cylinder block 10 is configured to have a bottom surface to which a not-shown oil pan is coupled. The oil pan is configured to house a crankshaft, and reserve engine oil therein. The cylinder block 10 may include at least one cylinder bore 11. The cylinder block 10 may be included in an engine other than an in-line four-cylinder engine.

Next, the producing method for the cylinder block 10 according to the present embodiment will be described.

Figure 2:
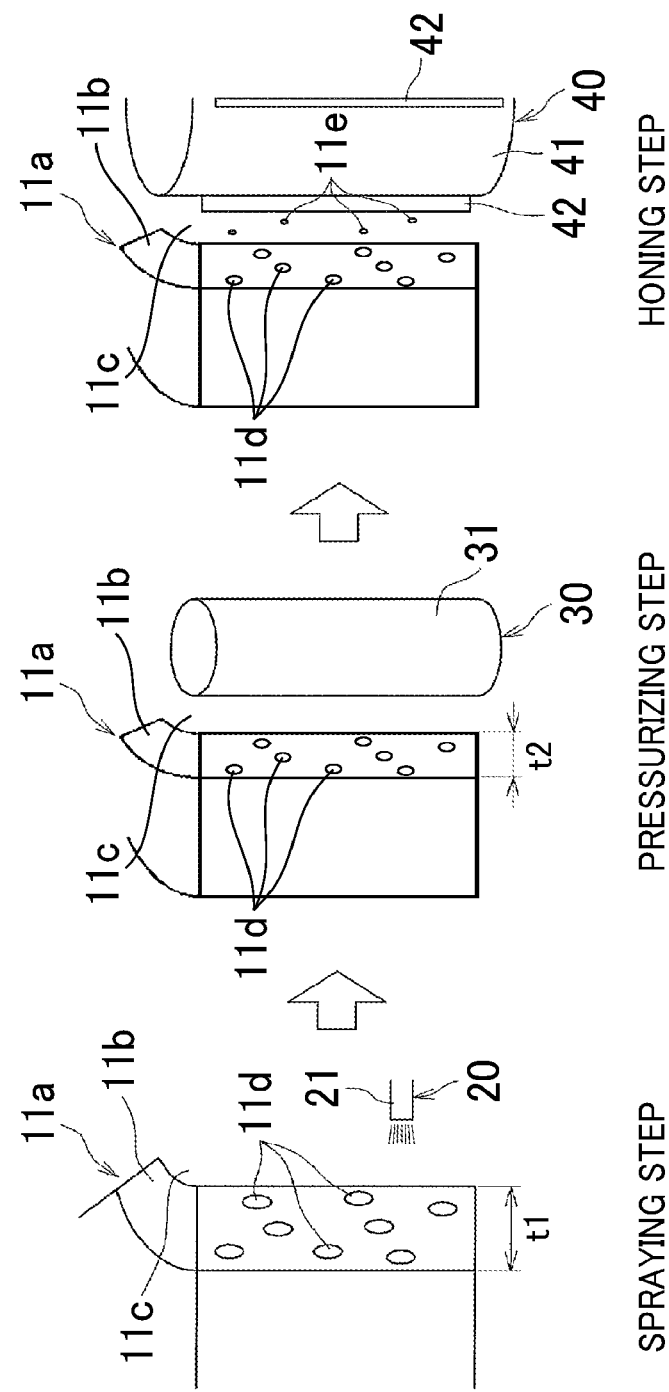
FIG. 2 is a drawing showing an example of the producing method for the cylinder block according to the present embodiment.

The producing process of producing the cylinder block 10 of the present embodiment is exemplified in FIG. 2. The producing process includes at least a spraying step, a pressurizing step, and a honing step. In the spraying step, a metallic material is sprayed onto the bore inner surface 11*a* of the cylinder bore 11 of the cylinder block 10. The sprayed metallic material forms the spray deposit 11b on the bore inner surface 11a. The pressurizing step is a step of applying a predetermined pressure to compress the spray deposit 11b formed on the bore inner surface 11a in the spray step. The honing step is a step of carrying out a honing processing onto a surface 11c of the spray deposit 11b after the pressurizing step. The honing processing is carried out for obtaining a predetermined roundness as a finishing step. FIG. 2 shows a part of the spray deposit 11b formed on the bore inner surface 11a of the cylinder block 10 in each step.

Hereinafter, each step will be specifically described. A casting step of casting the cylinder block 10 is carried out before the spraying step. A casting of the cylinder block 10 made of an aluminum alloy is obtained in this casting step.

In the spraying step, the spray deposit 11b with a predetermined film thickness t1 is formed on the bore inner surface 11a of the cylinder bore 11 of the cylinder block 10 by using a spraying apparatus 20. The cylinder block 10 is formed in the casting step. The spraying apparatus 20 is used for carrying out a plasma spraying, or the like, for example. The spraying apparatus 20 includes a spraying gun 21, rotating means, moving means, and others. The spraying gun 21 sprays a metallic material. The rotating means rotates the spraying gun 21 around a center axial line of the cylinder bore 11. The moving mean moves the spraying gun 21 in the axial direction of the cylinder bore 11. In FIG. 2, only the spraying gun 21 of the spraying apparatus 20 is illustrated.

The spraying gun 21 includes a nozzle at a front end thereof, and a wire made of a metallic material (e.g., an iron-base metal or the like) for spraying is fed into this nozzle. A front end of the wire fed into the nozzle of the spraying gun 21 is melted by arc heat. The melted wire is sprayed from the nozzle toward the bore inner surface 11a of the cylinder block 10. During the spraying of the melted wire, the spraying gun 21 is rotated around the center axial line of the cylinder bore 11 by the rotating means, and is also moved in the axial direction of the cylinder bore 11 by the moving mean. The spray deposit 11b is formed on the bore inner surface 11a of the cylinder block 10 by this spraying apparatus 20.

The spraying gun 21 is reciprocatingly moved plural times in the axial direction in a region across a substantially entire length of the cylinder bore 11 by the moving mean to bring the spray deposit 11b to have a predetermined film thickness t1. The aforementioned configuration of the spraying apparatus 20 is an example, and the spraying processing may be carried out by using the spraying apparatus 20 having another configuration. As a preprocessing for the spraying step, a processing of forming fine roughness on the bore inner surface 11a of the cylinder block 10 may be carried out. Such fine roughness can enhance tight adhesion of the spray deposit 11b onto the bore inner surface 11a of the cylinder block 10. This preprocessing may be carried out by a shot blast method or the like.

In the subsequent pressurizing step, a predetermined pressure is applied by a pressurizing apparatus 30 onto the spray deposit 11b formed on the bore inner surface 11a of the cylinder bore 11 in the spraying step. The spray deposit 11b is pressed (compressed) to be crushed with the pressure. In this pressurizing step, the spray deposit 11b is adjusted to have a predetermined film thickness (width in a radial direction) t2.

The pressurizing apparatus 30 includes cylindrical rollers 31, pressurizing means, rotating means, and others, for example. Through the pressurizing means, each roller 31 is pushed against the surface 11c of the spray deposit 11b of the cylinder bore 11 in the radial direction at a predetermined pressure. The rotating means rotates each roller 31 around the center axial line of the cylinder bore 11. In FIG. 2, only the roller 31 of the pressurizing apparatus 30 is illustrated.

Each roller 31 is pushed against the surface 11c of the spray deposit 11b of the cylinder bore 11 in the radially outward direction at a predetermined pressure by the pressurizing means. Specifically, the multiple rollers 31 are arranged at an outer circumference of a not-shown roller support member in the circumferential direction with equal intervals. Each roller 31 is so disposed as to be displaceable in the radial direction of the cylinder bore 11. For example, each roller 31 is pushed against the surface 11c of the spray deposit 11b by the pressurizing means such as a coil spring, for example. In this manner, while the spray deposit 11b of the cylinder bore 11 is pressurized at a predetermined pressure by each roller 31, each roller 31 is rotated around the center axial line of the cylinder bore 11 by the rotating means. Through this, the spray deposit 11b of the cylinder bore 11 is pressed (compressed) to be crushed to flatten the surface 11c of the spray deposit 11b. The aforementioned configuration of the pressurizing apparatus 30 is an example, and the pressurizing processing may be carried out by using the pressurizing apparatus 30 having another configuration.

The pressurizing step is carried out immediately after completion of the spraying step, and the spray deposit 11b in a relatively high-temperature state immediately after the spraying is subjected to the pressurizing processing by the pressurizing apparatus 30. In the pressurizing step, the film thickness of the spray deposit 11b formed on the bore inner surface 11a of the cylinder block 10 is adjusted. The film thickness of the spray deposit 11b is adjusted in the pressurizing step, thereby adjusting an bore inner diameter of the cylinder bore 11 of the cylinder block 10 to be a bore inner diameter thereof at a starting point of starting the honing processing (reference point of starting the processing) to be subsequently carried out. By previously calculating reduction in film thickness of the spray deposit 11b due to compression of the spray deposit 11b in the pressurizing step, the bore inner diameter of the cylinder bore 11 after the pressurizing step is controlled to be the bore inner diameter of the cylinder bore 11 at the starting point of starting the honing processing.

Subsequently, in the honing step, the honing processing is applied by a honing apparatus 40 onto the surface 11c of the spray deposit 11b of the cylinder bore 11 which has been adjusted to have the predetermined film thickness t2 in the pressurizing step. The honing apparatus 40 is configured to include a honing head 41, rotating means, moving means, and others, for example. The honing head 41 has grindstones (honing stones) 42 for honing on an outer circumferential surface thereof. The honing head 41 is rotated around the center axial line of the cylinder bore 11 by the rotating means. The honing head 41 is moved in the axial direction of the cylinder bore 11 by the moving means. In FIG. 2, only the honing head 41 and the honing stones 42 of the honing apparatus 40 are illustrated.

The plural honing stones 42 are arranged at an outer circumference of the honing head 41 in the circumferential direction with equal intervals. Each honing stone 42 is so disposed as to be displaceable in the radially outward direction of the honing head 41. During the honing processing relative to the spray deposit 11b of the cylinder bore 11, the honing stones 42 become displaced in the radially outward direction, thus coming into a state of being pushed against the surface 11c of the spray deposit 11b. In this state, the honing head 41 is rotated around the center axial line of the cylinder bore 11 by the rotating means, and is also moved in the axial direction of the cylinder bore 11 by the moving means. With this honing apparatus 40, fine linear grinding marks called cross hatch marks intersecting one another are formed on the surface 11c of the spray deposit 11b of the cylinder bore 11. The aforementioned configuration of the honing apparatus 40 is an example, and the honing processing may also be carried out by using the honing apparatus 40 having another configuration.

In the aforementioned producing process of the cylinder block 10, as shown in FIG. 2, a number of gas pockets 11d are formed inside the spray deposit 11b after the spraying step. In other words, gaps generated among particles of the metallic material that has been sprayed onto the bore inner surface 11a of the cylinder block 10 by the spraying gun 21 during the spraying step become the gas pockets 11d. After the honing step, the gas pockets 11d appear as pits 11e on the surface 11c of the spray deposit 11b. Accordingly, oil is retained in the pits 11e appearing on the surface 11c of the spray deposit 11b during the engine operation.

Herein, if the area ratio (pit ratio) of the pits 11e in the surface 11c of the spray deposit 11b after the honing processing becomes increased, the amount of oil retained in the pits 11e become increased during the engine operation. Consequently, there arises a concern about inconvenience such as increase in amount of oil consumption due to oil combustion.

In the present embodiment, however, as aforementioned, after the spraying step and before the honing step, the pressurizing step is carried out; thus the spray deposit 11b formed on the bore inner surface 11a of the cylinder block 10 is pressed (compressed) to be crushed in this pressurizing step, thereby pressing the gas pockets 11d formed inside the spray deposit 11b are crushed. Hence, compared with the case of omitting the pressurizing step (e.g., see FIG. 4), the surface area of the pits 11e appearing on the surface 11c of the spray deposit 11b after the honing processing becomes smaller; therefore, the area ratio of the pits 11e in the surface 11c of the spray deposit 11b after the honing processing is decreased. Accordingly, during the engine operation, the oil amount retained in the pits 11e is reduced, thereby reducing the amount of oil consumption due to the oil combustion (see FIG. 3).

Figure 3:
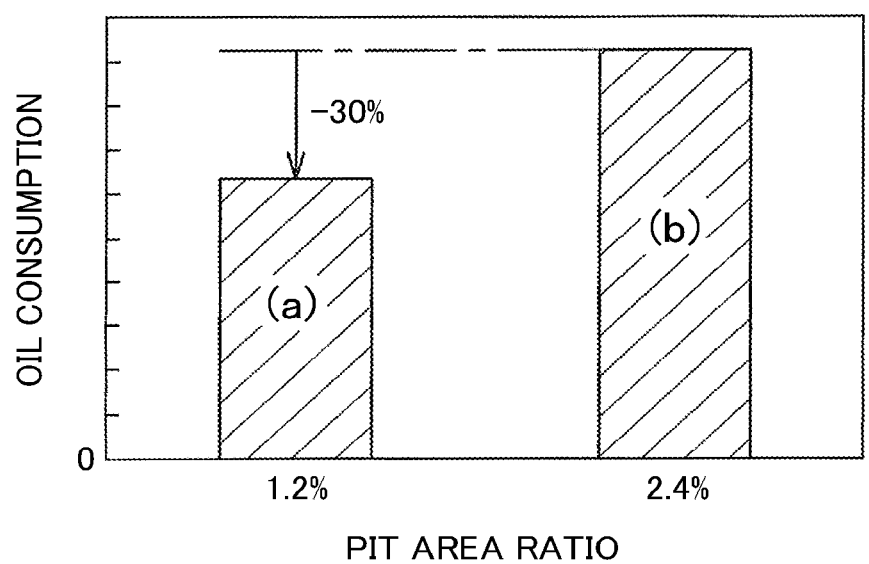
FIG. 3 is a drawing showing a relation between a pit area ratio in a bore inner surface of the cylinder block and amount of oil consumption during engine operation.
Figure 4:
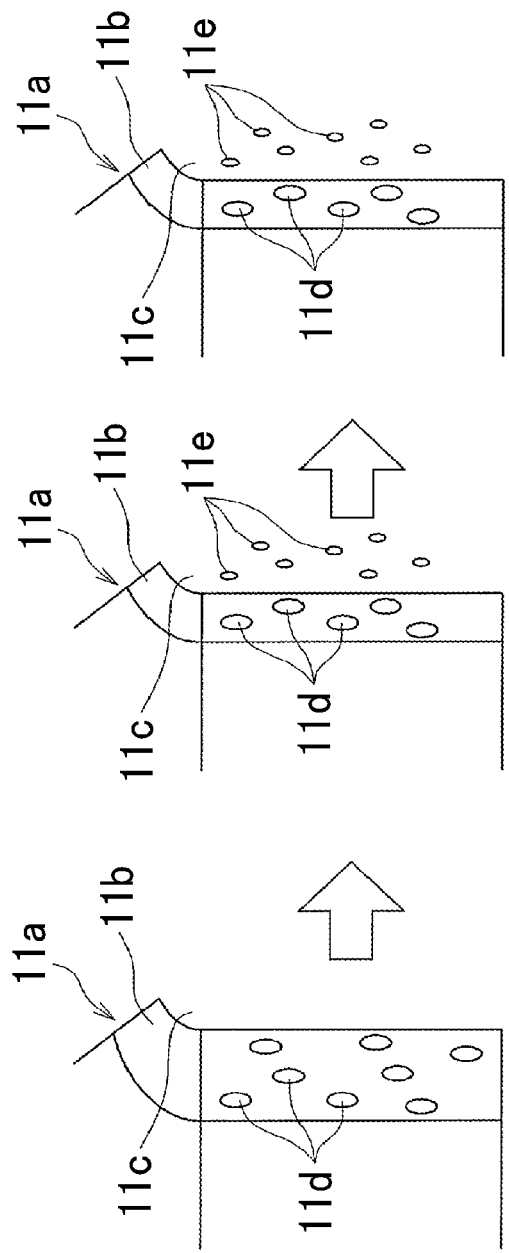
FIG. 4 is a drawing showing a comparative example of the producing method for the cylinder block.

FIG. 3 shows a relation between the pit area ratio of the bore inner surface 11a of the cylinder block 10 and the amount of oil consumption during the engine operation, and also shows a comparison between the case of an example to which the present embodiment is applied as shown in (a) and the case of a comparative example of omitting the pressurizing step as shown in (b) (see FIG. 4). In the comparative example as shown in FIG. 4, as the producing process of the cylinder block, the pressurizing step is omitted, which is different from the present embodiment. However, instead of the pressurizing step, a boring step is carried out after the spraying step and before the honing step. In the boring step, the film thickness of the spray deposit formed on the bore inner surface of the cylinder block is controlled, thereby controlling the bore inner diameter of the cylinder block to be a bore inner diameter at a starting point of starting the honing processing to be subsequently carried out.

As shown in FIG. 3, in the example to which the present embodiment is applied, the amount of oil consumption during the engine operation is reduced by approximately 70% compared with the comparative example. As aforementioned, in the present embodiment, it is appreciated that compared with the case of omitting the pressurizing step, the pit area ratio in the bore inner surface 11a of the cylinder block 10 is reduced, and the amount of oil consumption due to the oil combustion during the engine operation is reduced. The aforementioned values of the pit area ratio, the reduction in pit area ratio, and the reduction in oil consumption are merely an example, and these are not limited to the aforementioned values.

In the present embodiment, the pressurizing step is carried out after the spraying step and before the honing step. Through this pressurizing step, the bore inner diameter of the cylinder block 10 is adjusted to be the bore inner diameter at the starting point of starting the honing processing. Since the bore inner diameter is adjusted in the pressurizing step, it becomes unnecessary to additionally carry out the boring processing before the honing step. Because the pressurizing step is carried out immediately after the spraying step is completed, the pressurizing processing is applied to the spray deposit 11b in a relatively high-temperature state. Hence, the film thickness of the spray deposit 11b can easily be adjusted through the pressurizing step. Accordingly, it becomes unnecessary to re-heat the spray deposit 11b during the pressurizing step. It may also be configured that the boring processing is carried out before the honing step to adjust the bore inner diameter of the cylinder block 10 to be the bore inner diameter at the starting point of starting the honing processing.

The foregoing embodiment disclosed herein is only shown by way of illustration in all respects and does not constitute a basis of restrictive interpretation. Therefore, the technical scope of the present disclosure is not interpreted only by the foregoing embodiment but is defined based on the claims. All modifications that fall within the meaning and range of equivalence to the claims are embraced in the technical scope of the present disclosure.

The present disclosure is usable to a producing method for a cylinder block in which a spray deposit is formed on a bore inner surface of a cylinder bore.

What is claimed is:

1. A method for producing a cylinder block, the cylinder block including at least one cylinder bore and the cylinder bore including an inner surface, the method comprising:
    spraying a metallic material onto the inner surface of the cylinder bore to form a spray deposit;
    applying pressure to compress the spray deposit with a roller in a radial direction of the cylinder bore, to form a compressed spray deposit with fewer gas pits than that in the spray deposit; and
    honing a surface of the compressed spray deposit.

2. The method according to claim 1, wherein
    the spray deposit on the inner surface of the cylinder bore is compressed to a honing inner diameter of the cylinder bore to start the honing of the surface of the compressed spray deposit.

3. The method according to claim 1, wherein the roller rotates around a center axis of the cylinder bore.

* * * * *